United States Patent
Kobayashi

(10) Patent No.: US 8,803,949 B2
(45) Date of Patent: Aug. 12, 2014

(54) REPRODUCING APPARATUS AND REPRODUCING METHOD

(75) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 869 days.

(21) Appl. No.: 12/419,850

(22) Filed: Apr. 7, 2009

(65) Prior Publication Data

US 2009/0252473 A1    Oct. 8, 2009

(30) Foreign Application Priority Data

Apr. 7, 2008   (JP) ................................ 2008-099304

(51) Int. Cl.
*H04N 13/02*   (2006.01)

(52) U.S. Cl.
USPC ............................ 348/46; 386/276; 348/208.4

(58) Field of Classification Search
USPC ........................................ 386/248; 348/208.4
See application file for complete search history.

(56) References Cited

U.S. PATENT DOCUMENTS

| | | | |
|---|---|---|---|
| 6,772,125 B2 * | 8/2004 | Harradine et al. ............. | 704/278 |
| 8,072,498 B2 * | 12/2011 | Ito et al. ...................... | 348/208.4 |
| 2005/0041842 A1 * | 2/2005 | Frakes et al. ................. | 382/128 |
| 2005/0117033 A1 * | 6/2005 | Matsui .......................... | 348/239 |
| 2006/0203109 A1 * | 9/2006 | Ono ............................... | 348/239 |
| 2007/0098245 A1 * | 5/2007 | Mylaraswamy et al. ..... | 382/141 |
| 2008/0101714 A1 * | 5/2008 | Ono ............................... | 382/260 |
| 2009/0316009 A1 * | 12/2009 | Ito et al. ....................... | 348/208.4 |
| 2010/0225772 A1 * | 9/2010 | Murayama et al. ........ | 348/208.4 |

FOREIGN PATENT DOCUMENTS

| | | |
|---|---|---|
| JP | 06-038098 A | 2/1994 |
| JP | 06-245135 A | 9/1994 |
| JP | 09-130728 A | 5/1997 |
| JP | 2004-304712 A | 10/2004 |
| JP | 2005-051379 A | 2/2005 |
| JP | 2006-287921 | 10/2006 |
| JP | 2007-116309 A | 5/2007 |

* cited by examiner

*Primary Examiner* — Kambiz Zand
*Assistant Examiner* — Ali Shayanfar
(74) *Attorney, Agent, or Firm* — Canon USA Inc. IP Division

(57) ABSTRACT

A reproducing apparatus to reproduce a captured moving image includes a filter circuit that obtains a capturing condition (shutter speed information "s") of frames constituting the moving image. The filter circuit smoothes pixel information of the frames by using a parameter (directional smoothing filter kernel) according to the obtained shutter speed.

18 Claims, 5 Drawing Sheets

REPRODUCING APPARATUS AND REPRODUCING METHOD

BACKGROUND OF THE INVENTION

1. Field of the Invention

The present invention relates to a reproducing apparatus and a reproducing method to reproduce captured moving images. More specifically, reducing change in smoothness of motions of a subject during reproducing of moving images.

2. Description of the Related Art

Hitherto, when moving images including frames captured in a short exposure time are reproduced, motions of a subject are not smoothly reproduced particularly when the motions are large.

Japanese Patent Laid-Open No. 2006-287921 is an example of a related art to solve such a problem of exposure time during capturing and smoothness of motions during reproducing. According to Japanese Patent Laid-Open No. 2006-287921, a predictive image to be placed between two still images that are sequentially captured is generated and the predictive image is superimposed on the captured still images in order to obtain moving frame images showing smooth motions of a moving subject from a plurality of still images that are sequentially captured in a short exposure time.

However, if exposure time in capturing respective frames changes during capturing of moving images, smoothness of motions of a subject in the moving images may change during reproducing.

Exposure time changes during capturing in the following case, for example. When moving images are captured by a video camera with the aperture thereof fixed, the shutter speed may be changed to obtain correct exposure. In this case, for example, if the shutter speed is low at the start of capturing and if the shutter speed becomes high during capturing, smoothness of motions of a subject in the moving images may be lost at some point during reproducing. In this way, if the shutter speed changes from low (long exposure time) to high (short exposure time) during capturing of moving images, smoothness of motions of a subject in the moving images may be lost at some point during reproducing. On the other hand, if the shutter speed is high (short exposure time) at some time during capturing and if the shutter speed becomes low (long exposure time) thereafter, smoothness of motions of a subject changes during reproducing. Such a change in smoothness of motions of a subject during reproducing of moving images may cause a user to feel unnaturalness.

SUMMARY OF THE INVENTION

An embodiment of the present invention is directed to reducing change in smoothness of motions of a subject during reproducing of moving images that are captured in exposure time changing in respective frames.

According to an aspect of the present invention, there is provided a reproducing apparatus to reproduce a captured moving image. The reproducing apparatus includes an obtaining unit configured to obtain a capturing condition of frames constituting the moving image; and a smoothing unit configured to smooth pixel information of the frames to be reproduced by using a parameter according to the obtained capturing condition.

Further features of the present invention will become apparent from the following description of exemplary embodiments with reference to the attached drawings.

DESCRIPTION OF THE EMBODIMENTS

Hereinafter, a first embodiment of the present invention is described with reference to the drawings. Note that the technical scope of the present invention is not limited to this embodiment.

Figure 1:
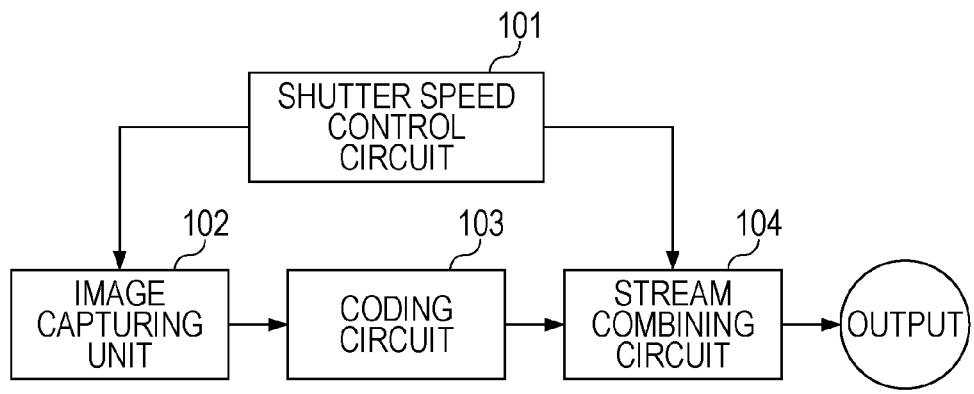
FIG. 1 illustrates an example of a configuration of an image capturing apparatus according to a first embodiment.
Figure 2:
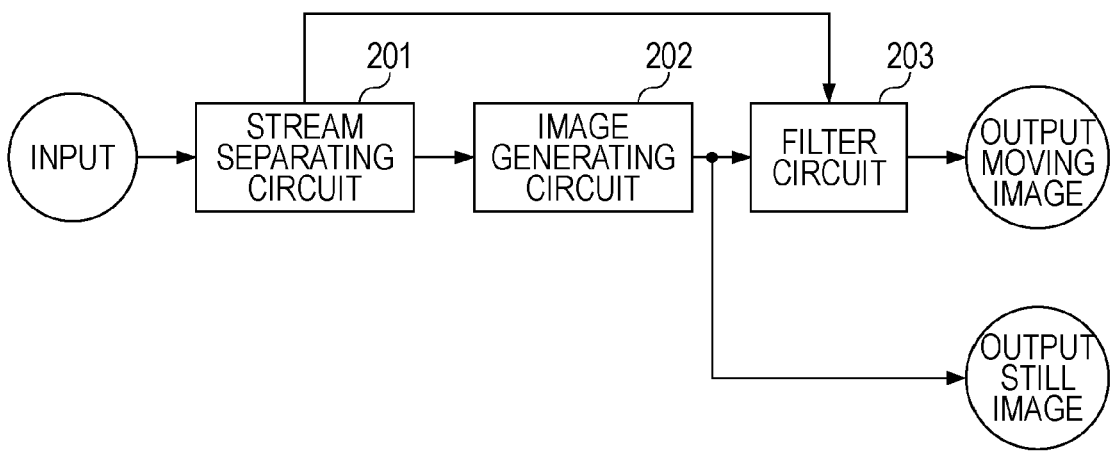
FIG. 2 illustrates an example of a configuration of a reproducing apparatus according to the first embodiment.

First, descriptions are given with reference to FIGS. 1 and 2 about an image capturing apparatus to add shutter speed information "s", which is a capturing condition to determine exposure time, to a coded stream; and a reproducing apparatus to control filtering by using the shutter speed information "s" during reproducing.

FIG. 1 illustrates an example of a configuration of an image capturing apparatus according to this embodiment. The image capturing apparatus according to this embodiment is executable by an apparatus capable of capturing moving images among a digital video camera, a digital camera, a personal computer (PC), a work station, a notebook PC, a palmtop PC, various home electric appliances including a computer, a game machine, and a mobile phone, or by a combination of those apparatuses.

Referring to FIG. 1, a shutter speed control circuit 101 sets a shutter speed for capturing each frame and outputs the shutter speed information "s" according to the setting to an image capturing unit 102 and a stream combining circuit 104. The image capturing unit 102 captures an image at the shutter speed set by the shutter speed control circuit 101 and outputs image data obtained accordingly to a coding circuit 103. The coding circuit 103 performs coding on the image data output from the image capturing unit 102 and outputs a coded stream obtained accordingly to the stream combining circuit 104. The stream combining circuit 104 combines the coded stream output from the coding circuit 103 and the shutter speed information "s" output from the shutter speed control circuit 101 by associating them with each other. For example, when the coded steam is based on the MPEG2 standard, the shutter speed information "s" can be embedded in an area called EIP (Extra information Picture) of a picture layer provided in each frame. Alternatively, the shutter speed information "s" may be embedded in another place. Then, a data stream obtained accordingly is output to the reproducing apparatus described below. Note that the data stream output from the stream combining circuit 104 may be supplied to a recording medium or the like.

FIG. 2 illustrates an example of a configuration of the reproducing apparatus according to this embodiment. The reproducing apparatus according to this embodiment is executable by an apparatus capable of reproducing captured moving images among a digital television set, a digital video camera, a digital camera, a personal computer (PC), a work station, a notebook PC, a palmtop PC, various home electric appliances including a computer, a game machine, and a mobile phone, or by a combination of those apparatuses.

Referring to FIG. 2, a stream separating circuit 201 separates the shutter speed information "s" and the coded stream from the data stream output from the image capturing apparatus according to this embodiment. Then, the stream separating circuit 201 outputs the shutter speed information "s" to a filter circuit 203 and also outputs the coded stream to an image generating circuit 202. The image generating circuit 202 decodes the coded stream and outputs decoded image data and coded motion vector information to the filter circuit 203. The filter circuit (smoothing circuit) 203 performs a filtering process on images to be reproduced based on the shutter speed information "s" output from the stream separating circuit 201 and the motion vector information output from the image generating circuit 202, so as to reproduce the images. Specifically, the filter circuit 203 obtains a capturing condition (shutter speed information "s") of the frames constituting the moving images. Then, the filter circuit 203 smoothes (filters) pixel information of the frames to be reproduced by using a parameter according to the obtained capturing condition.

Hereinafter, a filtering method executed by the filter circuit 203 using a parameter according to the shutter speed information "s" is described with reference to FIG. 3.

Figure 3:
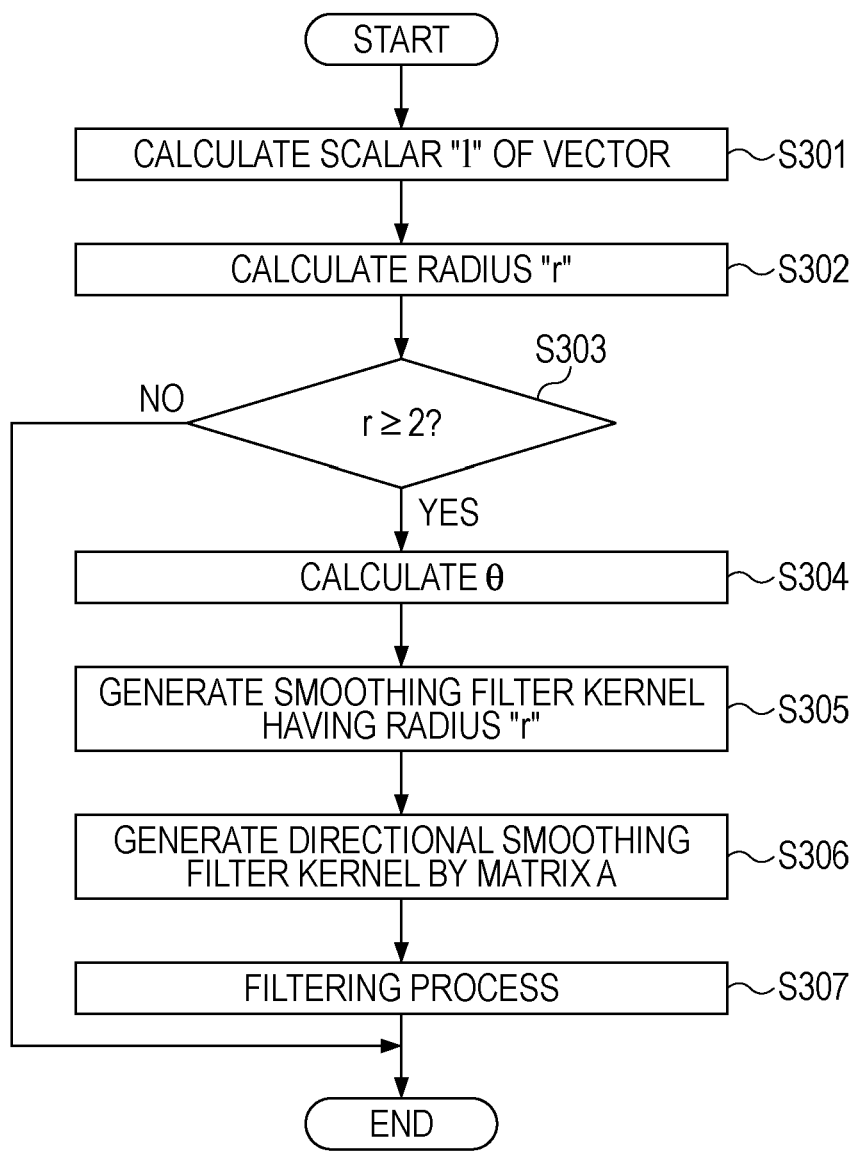
FIG. 3 illustrates a procedure of a filtering process according to the first embodiment.

FIG. 3 is a flowchart illustrating a procedure of a filtering process performed on target pixels by the filter circuit 203 according to this embodiment. In this embodiment, the filtering process described below with reference to FIG. 3 is performed on the respective target pixels. Alternatively, the process illustrated in FIG. 3 can be performed by software. That is, the reproducing apparatus according to this embodiment is capable of performing the respective steps illustrated in FIG. 3 based on a program stored in advance. In this case, a CPU (Central Processing Unit) to control each unit of the reproducing apparatus reads a control program stored in a ROM (Read Only Memory) or the like as necessary and executes the filtering process.

In this embodiment, descriptions are given about an example of setting a parameter according to the shutter speed information "s" and performing the filtering process using the set parameter in units of pixels. Alternatively, the process may be performed in an arbitrary unit, for example, in units of macroblocks. Here, the macroblock corresponds to 16×16 pixels in the MPEG2 standard or the like.

Referring to FIG. 3, in step S301, the filter circuit 203 calculates a scalar "l" of a motion vector in accordance with expression 1 based on motion vector information $(X_v, Y_v)$ of the target pixel output from the image generating circuit 202.

$$l=\sqrt{X_v^2+Y_v^2} \qquad \text{(expression 1)}$$

In step S302 (obtaining step), the filter circuit 203 obtains the shutter speed information "s" and calculates a filter radius "r" in accordance with expression 2 based on a frame interval "t", the shutter speed information "s", and the scalar "l" of the motion vector.

$$r = \frac{t-s}{2t}l \qquad \text{(expression 2)}$$

The frame interval "t" can be obtained in a process of decoding the coded stream by the image generating circuit 202. An example of the frame interval "t" includes 1/29.97, and examples of the shutter speed indicated by the shutter speed information "s" include 1/30, 1/60, and 1/100.

In step S303, the filter circuit 203 determines the value of the calculated filter radius "r". If the filter radius "r" is 2 or larger (YES in step S303), the process proceeds to step S304. If the filter radius "r" is smaller than 2 (NO in step S303), the process ends. Note that the threshold of the filter radius "r" determined in step S303 is not limited to 2, and an arbitrary value can be set. In this way, the filter radius "r" is determined in step S303 and the filtering process is performed if the filter radius "r" is equal to or larger than the predetermined value, whereby the amount of process related to the filtering process can be reduced.

Furthermore, the filter circuit 203 can determine the necessity of the filtering process in view of the frame interval "t", the shutter speed "s", and the scalar "l" by determining the filter radius "r". Alternatively, the filter circuit 203 may determine the necessity of the filtering process based on the scalar "l" of the vector calculated in step S301, not based on the filter radius "r". In this way, calculation of the filter radius "r" in the pixel on which the filtering process is not performed can be omitted.

In step S304, the filter circuit 203 calculates an angle θ in accordance with expression 3 based on the motion vector information $(X_v, Y_v)$.

$$\theta = \tan^{-1}\left(\frac{Y_v}{X_v}\right) \qquad \text{(expression 3)}$$

Then, in step S305, the filter circuit 203 generates a smoothing filter kernel having the filter radius "r". Incidentally, the order of steps S304 and S305 may be inverted.

Figure 4:
FIG. 4 illustrates an example of a filter kernel.

In step S306, the filter circuit 203 calculates a matrix A in accordance with expression 4 based on the angle θ calculated in step S304 and the filter radius "r" calculated in step S302. Then, the filter circuit 203 maps the smoothing filter kernel generated in step S305 by using the calculated matrix A, so as to generate a directional smoothing filter kernel. An example of the smoothing filter kernel generated in step S305 and an example of the directional smoothing filter kernel generated in step S306 are illustrated in FIG. 4.

$$A = \begin{pmatrix} \cos\theta & \sin\theta \\ \sin\theta & \cos\theta \end{pmatrix}\begin{pmatrix} 1 & 0 \\ 0 & \frac{1}{r} \end{pmatrix}. \qquad \text{(expression 4)}$$

In step S307 (smoothing step), the filter circuit 203 performs the filtering process on the target pixels by using the directional smoothing filter kernel generated in step S306. That is, the filter circuit 203 smoothes pixel information of the frames to be reproduced by using pixel information in the range according to the capturing condition (shutter speed information "s").

As described above, in this embodiment, the filtering process is performed by using the parameter (directional smoothing filter kernel) according to the capturing condition (shutter speed information "s"). For example, when the shutter speed is high (exposure time is short), filtering is performed by using a wide range of pixel information so that motions are smoothly reproduced. When the shutter speed is low (exposure time is long), filtering is performed by using a narrow range of pixel information or filtering is not performed so that information of the target pixels does not significantly change due to the filtering. Accordingly, even when moving images including frames captured in changing exposure time are reproduced, change in smoothness of motions of a subject can be reduced.

In the case where a still image is obtained from captured data, a still image on which no filtering process is performed can be obtained by outputting an image without performing the filtering process thereon.

In this embodiment, the filter circuit 203 generates an average filter having the radius "r" in step S305, but the present invention is not limited to this. That is, the radius "r" of the smoothing filter is determined in accordance with the capturing condition in this embodiment, but the radius "r" may be fixed to a certain value and a smoothing intensity in the smoothing filter may be changed in accordance with the capturing condition. Specifically, for example, in the case where an image captured at a low shutter speed is reproduced, the filter circuit 203 smoothes target pixels while minimizing the influence of information of the other pixels exerted on the target pixels (so that information of the target pixels does not significantly change by smoothing). On the other hand, in the case where an image captured at a high shutter speed is reproduced, the filter circuit 203 performs smoothing so that the target pixels are smoothed more strongly by information of the other pixels in the smoothing filter. Alternatively, weights of the respective pixels used in smoothing of the target pixels may be determined in accordance with motion vector information in the smoothing filter having a fixed radius "r".

That is, the filter circuit 203 may smooth pixel information of the frames to be reproduced by using the parameter indicating the intensity of smoothing according to the capturing condition. In this way, calculation of the radius "r" of the smoothing filter can be omitted.

The filter circuit 203 of this embodiment obtains, as motion information, motion vector information, that is, motion information of a subject in the frames, and generates a directional filter kernel in accordance with the capturing condition and the motion vector information. Alternatively, the filter circuit 203 may obtain motion information of the image capturing apparatus during capturing of moving images instead of the motion vector information and may generate a directional filter kernel in accordance with the capturing condition and the motion information of the image capturing apparatus. Accordingly, change in smoothness of motions of a subject can be reduced without using the motion vector information.

The stream combining circuit 104 of this embodiment combines the shutter speed information "s" as an optional entry so that the shutter speed information "s" is ignored in a reproducing apparatus incapable of controlling the filtering process according to this embodiment. Accordingly, a data stream that can be reproduced in an existing reproducing apparatus can be generated.

In this embodiment, descriptions have been given about an example of adding the shutter speed information "s" to each frame. Alternatively, the shutter speed information "s" may be added at other intervals, e.g., in units of GOPs (Group Of Pictures) or in units of sequences. In that case, the above-described filtering process is performed by using the shutter speed information "s" added to the header of each GOP or each sequence. Alternatively, the shutter speed information "s" may be added at the timing when the shutter speed changes. That is, the filter circuit 203 of this embodiment repeatedly obtains the capturing condition (shutter speed information "s") of frames.

The image generating circuit 202 of this embodiment outputs coded motion vector information. Alternatively, the image generating circuit 202 may re-search for a motion vector in each of decoded pixels or blocks and output the obtained motion vector.

In this embodiment, the shutter speed information "s" is used as information of the capturing condition to determine the parameter for performing the filtering process, but the present invention is not limited to this. The filtering process can be controlled by using other information, e.g., exposure time information or zooming factor information "z", as the capturing condition. Control of the filtering process using the zooming factor information "z" is described in detail below in a second embodiment.

In this embodiment, a series of steps about filtering are performed in units of pixels, but the present invention is not limited to this. For example, when motion vector information is given in units of macroblocks, steps S301 to S306 may be performed in units of macroblocks and only step S307 may be performed in units of pixels. Accordingly, the amount of process for filtering can be reduced.

Next, the second embodiment of the present invention is described with reference to the drawings. In the second embodiment, descriptions are given about a reproducing apparatus to control filtering by adding shutter speed information "s" and zooming factor information "z" as capturing conditions to a coded stream and by using the information of the capturing conditions during reproducing.

Figure 5:
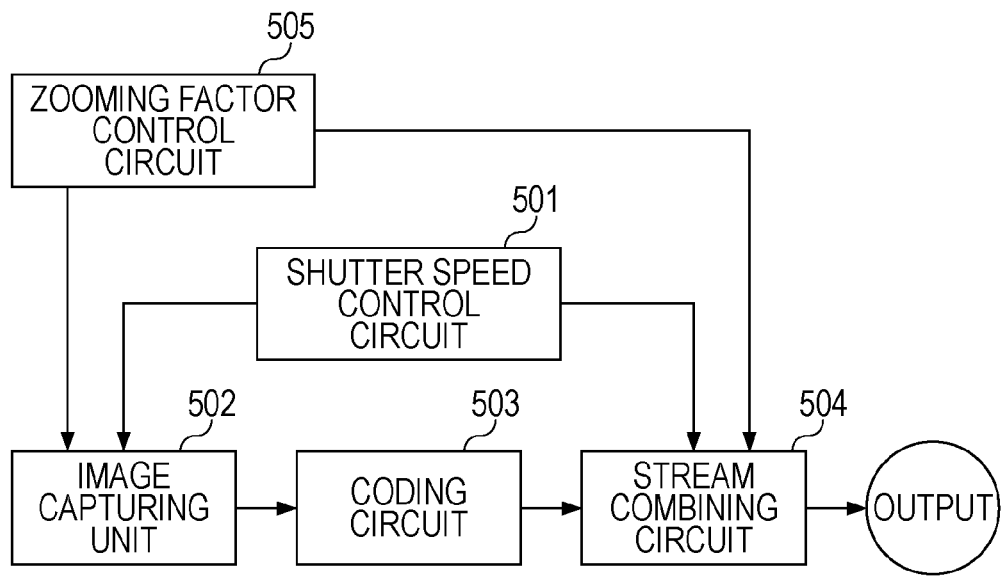
FIG. 5 illustrates an example of a configuration of an image capturing apparatus according to a second embodiment.
Figure 6:
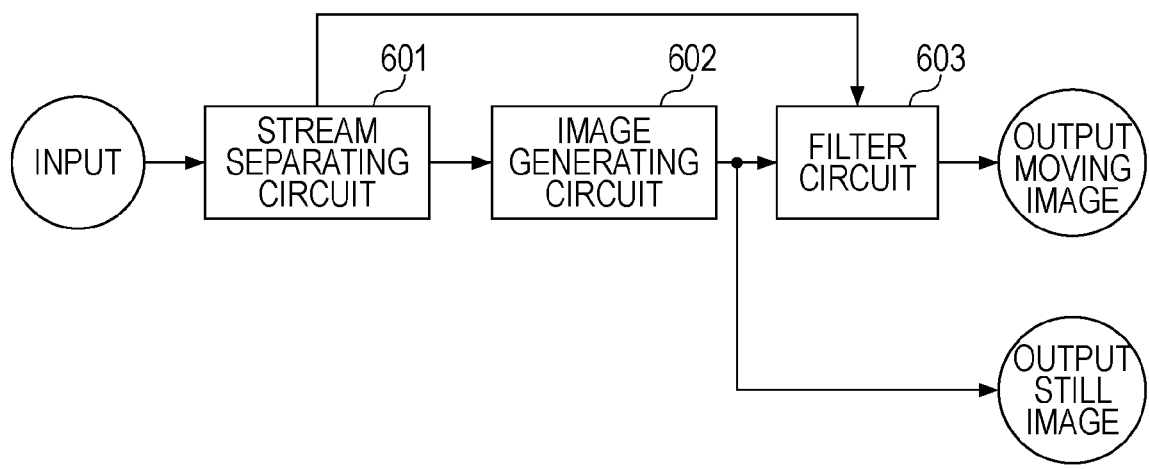
FIG. 6 illustrates an example of a configuration of a reproducing apparatus according to the second embodiment.

FIG. 5 illustrates an example of a configuration of an image capturing apparatus according to this embodiment, whereas FIG. 6 illustrates an example of a configuration of a reproducing apparatus according to this embodiment.

The image capturing apparatus illustrated in FIG. 5 is executable by an apparatus capable of capturing moving images among a digital video camera, a digital camera, a personal computer (PC), a work station, a notebook PC, a palmtop PC, various home electric appliances including a computer, a game machine, and a mobile phone, or by a combination of those apparatuses. The reproducing apparatus illustrated in FIG. 6 is executable by an apparatus capable of reproducing captured moving images among a digital television set, a digital video camera, a digital camera, a personal computer (PC), a work station, a notebook PC, a palmtop PC, various home electric appliances including a computer, a game machine, and a mobile phone, or by a combination of those apparatuses.

Referring to FIG. 5, a shutter speed control circuit 501 sets a shutter speed for capturing each frame and outputs the shutter speed information "s" according to the setting to an image capturing unit 502 and a stream combining circuit 504. A zooming factor control circuit 505 sets a zooming factor for capturing each frame in response to instructions from a user and outputs the zooming factor information "z" according to the setting to the image capturing unit 502 and the stream combining circuit 504. The image capturing unit 502 captures an image at the shutter speed according to the shutter speed information "s" output from the shutter speed control circuit 501 and outputs image data obtained accordingly to a coding circuit 503. The coding circuit 503 performs coding on the image data and outputs a coded stream obtained accordingly to the stream combining circuit 504. The stream combining circuit 504 combines the coded stream output from the coding circuit 503, the shutter speed information "s" output from the shutter speed control circuit 501, and the zooming factor information "z" output from the zooming factor control circuit 505 by associating them with each other. For example, when the coded steam is based on the MPEG2 standard, the shutter speed information "s" and the zooming factor information "z" can be embedded in an area called EIP (Extra information Picture) of a picture layer. Alternatively, the shutter speed information "s" and the zooming factor information "z" may be embedded in another place. Then, the stream combining circuit 504 outputs a data stream obtained accordingly to the reproducing apparatus of this embodiment described below. Note that the data stream output from the stream combining circuit 504 may be supplied to a recording medium or the like.

In the reproducing apparatus illustrated in FIG. 6, a stream separating circuit 601 separates the shutter speed information "s", the zooming factor information "z", and the coded stream from the data stream output from the image capturing apparatus according to this embodiment. Then, the stream separating circuit 601 outputs the shutter speed information "s" and the zooming factor information "z" to a filter circuit 603 and also outputs the coded stream to an image generating circuit 602. The image generating circuit 602 decodes the coded stream output from the stream separating circuit 601 and outputs decoded image data and coded motion vector information to the filter circuit 603. The filter circuit 603 performs a filtering process on images to be reproduced based on the shutter speed information "s" and the zooming factor information "z" output from the stream separating circuit 601 and the motion vector information output from the image generating circuit 602, so as to reproduce the images. Specifically, the filter circuit 603 obtains capturing conditions (shutter speed information "s" and zooming factor information "z") of the frames constituting the moving images. Also, the filter circuit 603 smoothes (filters) pixel information of the frames to be reproduced by using a parameter according to the obtained capturing conditions.

Hereinafter, a filtering method executed by the filter circuit 603 is described with reference to FIG. 7.

Figure 7:
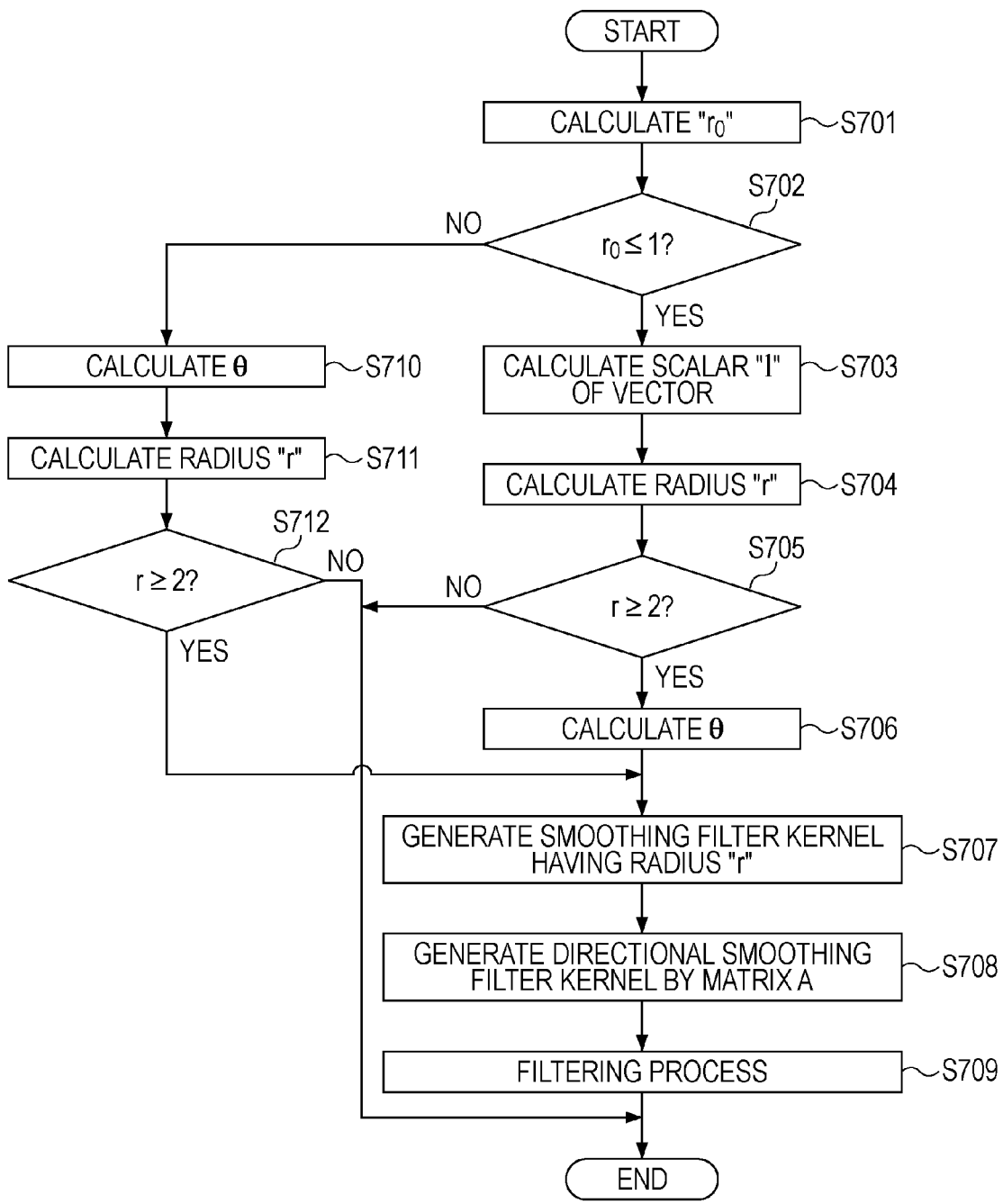
FIG. 7 illustrates a procedure of a filtering process according to the second embodiment.

FIG. 7 is a flowchart illustrating a procedure of a filtering process performed on target pixels by the filter circuit 603 according to this embodiment. In this embodiment, the filtering process described below with reference to FIG. 7 is performed on the respective target pixels.

Alternatively, the process illustrated in FIG. 7 can be performed by software. That is, the reproducing apparatus according to this embodiment is capable of performing the respective steps illustrated in FIG. 7 based on a program stored in advance. In this case, a CPU to control each unit of the reproducing apparatus reads a control program stored in a ROM or the like as necessary and executes the filtering process.

In this embodiment, descriptions are given about an example of performing a series of steps about filtering in units of pixels. Alternatively, the process may be performed in an arbitrary unit, for example, in units of macroblocks.

Referring to FIG. 7, in step S701, the filter circuit 603 calculates a motion amount "$r_0$" in accordance with expression 5 based on zooming factor information "$z_1$" of a frame (current frame) in the target pixel and zooming factor information "$z_0$" of the preceding frame that is to be reproduced immediately before the current frame.

$$r_0 = \sqrt{k} \sqrt{(x_0 - x_1)^2 + (y_0 - y_1)^2}$$ (expression 5)

$$k = \begin{cases} z_1/z_0 & (z_1 \geq z_0) \\ z_0/z_1 & (z_0 > z_1) \end{cases}$$

In expression 5, $(x_0, y_0)$ are coordinates of the center of the current frame, whereas $(x_1, y_1)$ are coordinates of the target pixel.

In step S702, the filter circuit 603 determines the motion amount "$r_0$". If "$r_0$" is equal to or smaller than 1 (YES in step S702), the process proceeds to step S703. If "$r_0$" is larger than 1 (NO in step S702), the process proceeds to step S710. The threshold of the motion amount "$r_0$" determined in step S702 is not limited to 1, and an arbitrary value can be set.

In this way, the filter circuit 603 changes the process in accordance with the motion amount "$r_0$", so that the filtering process using the zooming factor information "z" can be omitted when change in zooming factor is small or when change in zooming factor has a little influence on a target pixel.

In step S710, the filter circuit 603 calculates an angle θ in accordance with expression 6 based on the center coordinates $(x_0, y_0)$ of the current frame and the coordinates $(x_1, y_1)$ of the target pixel.

$$\theta = \tan^{-1}\left(\frac{y_0 - y_1}{x_0 - x_1}\right)$$ (expression 6)

In step S711 (obtaining step), the filter circuit 603 obtains the shutter speed information "s" and calculates a filter radius "r" in accordance with expression 7 based on a frame interval "t", the shutter speed information "s", and the motion amount "$r_0$".

$$r = \frac{t-s}{2t}r0$$ (expression 7)

The frame interval "t" can be obtained in a process of decoding the coded stream by the image generating circuit 602. An example of the frame interval "t" includes 1/29.97, and examples of the shutter speed indicated by the shutter speed information "s" include 1/30, 1/60, and 1/100. The order of steps S710 and S711 may be inverted.

In step S712, the filter circuit 603 determines the value of the filter radius "r". If the filter radius "r" is 2 or larger (YES in step S712), the process proceeds to step S707. If the filter radius "r" is smaller than 2 (NO in step S712), the process ends and the filtering process on the next pixel starts. Note that the threshold of the filter radius "r" determined in step S712 is not limited to 2, and an arbitrary value can be set. In this way, the filter circuit 603 determines the filter radius "r" in step S712 and performs the filtering process if the filter radius "r" is equal to or larger than the predetermined value, whereby the amount of process related to the filtering process can be reduced. Furthermore, the filter circuit 603 can determine the necessity of the filtering process in view of the frame interval "t", the shutter speed "s", and the motion amount "$r_0$" according to the zooming factor by determining the filter radius "r".

In step S703, the filter circuit 603 calculates a scalar "l" of a motion vector in accordance with expression 1 based on motion vector information $(X_v, Y_v)$ of the target pixel output from the image generating circuit 602.

In step S704 (obtaining step), the filter circuit 603 obtains the shutter speed information "s" and calculates a filter radius "r" in accordance with expression 2 based on a frame interval "t", the shutter speed information "s", and the scalar "l" of the motion vector. The frame interval "t" can be obtained in a process of decoding the coded stream by the image generating circuit 602.

In step S705, the filter circuit 603 determines the value of the filter radius "r". If the filter radius "r" is 2 or larger (YES in step S705), the process proceeds to step S706. If the filter radius "r" is smaller than 2 (NO in step S705), the process ends and the filtering process on the next pixel starts. Note that the threshold of the filter radius "r" determined in step S705 is not limited to 2, and an arbitrary value can be set. In this way, the filter circuit 603 determines the filter radius "r" in step S705 and performs the filtering process if the filter radius "r" is equal to or larger than the predetermined value, whereby the amount of process related to the filtering process can be reduced.

Furthermore, the filter circuit 603 can determine the necessity of the filtering process in view of the frame interval "t", the shutter speed "s", and the scalar "l" by determining the filter radius "r". Alternatively, the filter circuit 603 may determine the necessity of the filtering process based on the scalar "l" of the vector calculated in step S703, not based on the filter radius "r". In this way, calculation of the filter radius "r" in the pixel on which the filtering process is not performed can be reduced.

In step S706, the filter circuit 603 calculates an angle θ in accordance with expression 3 based on the motion vector information $(X_v, Y_v)$. Then, in step S707, the filter circuit 603 generates a smoothing filter kernel having the filter radius "r". Incidentally, the order of steps S706 and S707 may be inverted.

In step S708, the filter circuit 603 calculates a matrix A in accordance with expression 4 based on the angle θ calculated in step S706 and the filter radius "r" calculated in step S704. Then, the filter circuit 603 maps the smoothing filter kernel generated in step S707 by using the calculated matrix A, so as to generate a directional smoothing filter kernel. An example of the smoothing filter kernel generated in step S707 and an example of the directional smoothing filter kernel generated in step S708 are illustrated in FIG. 4.

In step S709 (smoothing step), the filter circuit 603 performs the filtering process on the target pixels by using the directional smoothing filter kernel generated in step S708. That is, the filter circuit 603 smoothes pixel information of the frames to be reproduced by using pixel information in the range according to the capturing conditions (shutter speed information "s" and zooming factor information "z").

As described above, the filter circuit 603 according to this embodiment performs the filtering process by using the parameter (directional smoothing filter kernel) according to the capturing conditions (shutter speed information "s" and zooming factor information "z"). For example, when the shutter speed is high (exposure time is short), filtering is performed by using a wide range of pixel information so that motions are smoothly reproduced. On the other hand, when the shutter speed is low (exposure time is long), filtering is performed by using a narrow range of pixel information or filtering is not performed so that information of the target pixels does not significantly change due to the filtering.

Also, when the position of a subject on a display screen significantly changes due to change in zooming factor, the filter circuit 603 performs filtering on the subject by using a wide range of pixel information so that the motions of the subject are smoothly reproduced. On the other hand, when the change of the position of the subject due to change in zooming factor is small or when the zooming factor does not change, the filter circuit 603 performs filtering by using a narrow range of pixel information or does not perform filtering so that information of the target pixels does not significantly change due to the filtering. Accordingly, when moving images including frames captured in changing exposure time are reproduced, change in smoothness of motions of a subject can be reduced. Furthermore, motions of a subject due to change in zooming factor during capturing can be reproduced smoothly.

The stream combining circuit 504 of this embodiment combines the capturing conditions (shutter speed information "s" and zooming factor information "z") as an optional entry so that the capturing conditions are ignored in a reproducing apparatus incapable of controlling the filtering process according to this embodiment. Accordingly, a data stream that can be reproduced in an existing reproducing apparatus can be generated.

The image generating circuit 602 of this embodiment outputs coded motion vector information. Alternatively, the image generating circuit 602 may re-search for a motion vector in each of decoded pixels or blocks and output the obtained motion vector.

In this embodiment, the filter circuit 603 generates an average filter having the radius "r" in step S707, but the present invention is not limited to this. That is, the filter circuit 603 of this embodiment determines the radius "r" of the smoothing filter in accordance with the capturing conditions, but the radius "r" may be fixed to a certain value and a smoothing intensity in the smoothing filter may be changed in accordance with the capturing conditions. Specifically, for example, in the case where an image captured at a low shutter speed is reproduced, the filter circuit 603 smoothes target pixels while minimizing the influence of information of the other pixels exerted on the target pixels (so that information of the target pixels does not significantly change by smoothing). On the other hand, in the case where an image captured at a high shutter speed is reproduced, the filter circuit 603 performs smoothing so that the target pixels are smoothed more strongly by information of the other pixels in the smoothing filter. Alternatively, weights of the respective pixels used in smoothing of the target pixels may be determined in accordance with motion vector information in the smoothing filter having a fixed radius "r". That is, the filter circuit 603 may smooth pixel information of the frames to be reproduced by using the parameter indicating the intensity of smoothing according to the capturing conditions. In this way, calculation of the radius "r" of the smoothing filter can be omitted.

The filter circuit 603 of this embodiment obtains, as motion information, motion vector information, that is, motion information of a subject, and generates a directional filter kernel in accordance with the capturing conditions and the motion vector information. Alternatively, the filter circuit 603 may obtain motion information of the image capturing apparatus during capturing of moving images instead of the motion vector information and may generate a directional filter kernel in accordance with the capturing conditions and the motion information of the image capturing apparatus. Accordingly, change in smoothness of motions of a subject can be reduced without using the motion vector information.

In the case where a still image is obtained from captured data, a still image on which no filtering process is performed can be obtained by outputting an image without performing the filtering process thereon.

In this embodiment, descriptions have been given about an example of adding the capturing conditions to each frame. Alternatively, the capturing conditions may be added at other intervals, e.g., in units of GOPs or in units of sequences. In that case, the above-described filtering process is performed by using the capturing conditions added to the header of each GOP or each sequence. Alternatively, the capturing conditions may be added at the timing when the capturing conditions change. That is, the filter circuit 603 of this embodiment repeatedly obtains the capturing conditions (shutter speed information "s" and zooming factor information "z") of frames.

In this embodiment, a series of steps about filtering are performed in units of pixels, but the present invention is not limited to this. For example, when motion vector information is given in units of macroblocks, steps S701 to S708 may be performed in units of macroblocks and only step S709 may be performed in units of pixels. Accordingly, the amount of process for filtering can be reduced.

The present invention can also be achieved by providing a computer-readable storage medium which stores software (program code) for implementing the functions of the above-described exemplary embodiments to a method or an apparatus. The software (program code) stored in the storage medium can be read and executed by a computer (central processing unit (CPU) or micro-processing unit (MPU)) of the system or the apparatus.

In this case, the program code read from the storage medium itself realizes the functions of the above-described exemplary embodiments using the computer. The program code itself and the storage medium which stores the program code constitute an embodiment of the present invention.

A computer executable program to implement the above-mentioned exemplary embodiments can take any form, for example, an object code, a program executed by an interpreter, or script data supplied to an operating system (OS) as long as it has the functions of the program.

The storage medium can be, for example, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, or a digital versatile disc (DVD, DVD-ROM, and DVD-R).

In this case, the program code read from the storage medium itself realizes the functions of the exemplary embodiment, and the storage medium storing the program code constitutes the present invention.

The program code can also be supplied by the system or the apparatus accessing a website on the Internet via a browser of a client computer. The program code itself or a compressed file including an auto-install function can be downloaded from the website onto the storage medium such as a hard disk. In addition, the program code can be divided into a plurality of files, and each file can be downloaded from one or more websites. Namely, the present invention can be applied to a World Wide Web (WWW) server and a file transfer protocol (ftp) server that allow numerous users to download the program files so that the functions or processes of the present invention can be realized on their computers.

Furthermore, the program code can be encrypted and stored in a storage medium, such as a CD-ROM, to be distributed to users. A user who satisfies given conditions can download the key information for decrypting the program from a website via the Internet. By using the key information, the encrypted program can be executed and installed in a computer to realize the functions of the present invention.

Furthermore, the above-described exemplary embodiments can be not only realized by executing the program code read by a CPU. An operating system (OS) or the like working on a computer can also perform a part or the whole of processes according to instructions of the program cod) and realize the functions of the above-described exemplary embodiments.

Furthermore, the program code read from a storage medium can be stored in a memory equipped in a function expansion board inserted in a computer or a function expansion unit connected to the computer, and a CPU in the function expansion board or the function expansion unit can execute all or a part of the processing based on the instructions of the program code to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-099304 filed Apr. 7, 2008, which is hereby incorporated by reference herein in its entirety.

What is claimed is:

1. A reproducing apparatus comprising:
   an acquiring unit configured to acquire a data stream including moving image data;
   an extracting unit configured to extract shutter speed information used when the moving image data is captured by a capturing apparatus, from the data stream acquired by the acquiring unit;
   a filtering unit configured to generate filtered moving image data based on performing smoothing filter processing on the moving image data by using the extracted shutter speed information such that the moving image data included in the data stream are smoothed more strongly in a case where shutter speed information extracted by the extracting unit corresponds to a shutter speed higher than a threshold of speed than a case where shutter speed information extracted by the extracting unit corresponds to a shutter speed lower than the threshold of speed; and
   an outputting unit configured to output the filtered moving image data for displaying.

2. The reproducing apparatus according to claim 1, wherein the extracting unit extracts first shutter speed information corresponding to a first frame of the moving image data and extracts second shutter speed information corresponding to second frame of moving image data.

3. The reproducing apparatus according to claim 1, wherein the filtering unit performs the smoothing filter processing on the moving image data by using pixel values in a range according to the shutter speed information such that a smoothed pixel value of the filtered moving image data is determined by the smoothing filter processing based on a first number of pixel values of the moving image data included in the data stream in a case where the shutter speed information corresponds to the shutter speed higher than the threshold of speed and, a smoothed pixel value of the filtered moving image data is determined by the smoothing filter processing based on a second number of pixel values of the moving image data included in the data stream in a case where the shutter speed information corresponds to the shutter speed lower than the threshold of speed, and wherein the second number is fewer than the first number.

4. The reproducing apparatus according to claim 1, wherein the filtering unit performs the smoothing filter processing such that a weight of pixel values corresponding to pixels excluding a target pixel and used for determining a pixel value of the filtered target pixel is larger in a case where the shutter speed information corresponds to the shutter speed higher than the threshold of speed than a case where the shutter speed information corresponds to the shutter speed lower than the threshold of speed.

5. The apparatus according to claim 1, further comprising a second extracting unit configured to extract motion information from the data stream acquired by the acquiring unit,
   wherein the filtering unit performs the smoothing filter processing on the moving image data by using the shutter speed information and the motion information such that the pixel values of the moving image data included in the data stream are smoothed more strongly in a case where motion information corresponds to a motion amount higher than a threshold of motion than a case where motion information corresponds to a motion amount lower than the threshold of motion.

6. The apparatus according to claim 5, further comprising a determining unit configured to determine, based on a direction specified by the motion information which is extracted by the second extracting unit, a filter form of the smoothing filter processing.

7. A reproducing method comprising:
acquiring a data stream including moving image data;
extracting shutter speed information used when the moving image data is captured by a capturing apparatus, from the data stream acquired by the acquiring step;
generating filtered moving image data based on performing smoothing filter processing on the moving image data by using the extracted shutter speed information such that the moving image data included in the data stream are smoothed more strongly in a case where shutter speed information extracted in the extracting step corresponds to a shutter speed higher than a threshold of speed than in a case where shutter speed information extracted in the extracting step corresponds to a shutter speed lower than the threshold of speed; and
outputting filtered moving image data on which the filter processing is performed in the performing step, as moving image data to be reproduced.

8. The method according to claim 7, wherein the extracting step extracts first shutter speed information corresponding to a first frame of the moving image data and extracts second shutter speed information corresponding to a second frame of moving image data.

9. The method according to claim 7, wherein the filtering step performs the smoothing filter processing on the moving image data by using pixel values in a range according to the shutter speed information such that a smoothed pixel value of the filtered moving image data is determined by the smoothing filter processing based on a first number of pixel values of the moving image data included in the data stream in a case where the shutter speed information corresponds to the shutter speed higher than the threshold of speed, and a smoothed pixel value of the filtered moving image data is determined by the smoothing filter processing based on a second number of pixel values of the moving image data included in the data stream in a case where the shutter speed information corresponds to the shutter speed lower than the threshold of speed, and wherein the second number is fewer than the first number.

10. The method according to claim 7, wherein the filtering step performs the smoothing filter processing such that a weight of pixel values corresponding to pixels excluding a target pixel and used for determining a pixel value of the filtered target pixel is larger in a case where the shutter speed information corresponds to the shutter speed higher than the threshold of speed than a case where the shutter speed information corresponds to the shutter speed lower than the threshold of speed.

11. The method according to claim 7, further comprising extracting motion information from the data stream acquired in the acquiring step, wherein the performing step performs the smoothing filter processing on the moving image data by using the shutter speed information and the motion information such that the pixel values of the moving image data included in the data stream are smoothed more strongly in a case where motion information corresponds to a motion amount higher than a threshold of motion than a case where motion information corresponds to a motion amount lower than the threshold of motion.

12. The method according to claim 7, further comprising determining, based on a motion direction specified by the motion information, a filter form of the smoothing filter processing.

13. A non-transitory computer-readable storage medium storing a computer-executable process, the computer-executable process causing a computer to perform a method of reproducing a captured moving image, the method comprising:
acquiring a data stream including moving image data;
extracting shutter speed information used when the moving image data is captured by a capturing apparatus, from the data stream acquired in the acquiring step;
generating filtered moving image data based on performing smoothing filter processing on the moving image data by using the extracted shutter speed information such that the moving image data included in the data stream are smoothed more strongly in a case where shutter speed information extracted in the extracting step corresponds to a shutter speed higher than a threshold of speed than in a case where shutter speed information extracted in the extracting step corresponds to a shutter speed lower than the threshold of speed; and
outputting filtered moving image data on which the filter processing is performed in the performing step, as moving image data to be reproduced.

14. The medium according to claim 13, wherein the extracting step extracts first shutter speed information corresponding to a first frame of the moving image data and extracts second shutter speed information corresponding to a second frame of moving image data.

15. The medium according to claim 13, wherein the filtering step performs the smoothing filter processing on the moving image data by using pixel values in a range according to the shutter speed information such that a smoothed pixel value of the filtered moving image data is determined by the smoothing filter processing based on a first number of pixel values of the moving image data included in the data stream in a case where the shutter speed information corresponds to the shutter speed higher than the threshold of speed, and a smoothed pixel value of the filtered moving image data is determined by the smoothing filter processing based on a second number of pixel values of the moving image data included in the data stream in a case where the shutter speed information corresponds to the shutter speed lower than the threshold of speed, and wherein the second number is fewer than the first number.

16. The medium according to claim 13, wherein the filtering step performs the smoothing filter processing such that a weight of pixel values corresponding to pixels excluding a target pixel and used for determining a pixel value of the filtered target pixel is larger in a case where the shutter speed information corresponds to the shutter speed higher than the threshold of speed than a case where the shutter speed information corresponds to the shutter speed lower than the threshold of speed.

17. The medium according to claim 13, further comprising extracting motion information from the data stream acquired in the acquiring step, wherein the performing step performs the smoothing filter processing on the moving image data by using the shutter speed information and the motion information such that the pixel values of the moving image data included in the data stream are smoothed more strongly in a case where motion information corresponds to a motion amount higher than a threshold of motion than a case where motion information corresponds to a motion amount lower than the threshold of motion.

18. The medium according to claim 13, further comprising determining, based on a motion direction specified by the motion information, a filter form of the smoothing filter processing.

* * * * *